(12) United States Patent
Schlansker et al.

(10) Patent No.: US 8,391,174 B2
(45) Date of Patent: Mar. 5, 2013

(54) DATA PACKET ROUTING

(75) Inventors: Michael Schlansker, Los Altos, CA (US); Jean Tourrilhes, Mountain View, CA (US); Dwight L. Barron, Houston, TX (US); Stephen G. Low, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 337 days.

(21) Appl. No.: 12/834,951

(22) Filed: Jul. 13, 2010

(65) Prior Publication Data
US 2012/0014265 A1    Jan. 19, 2012

(51) Int. Cl.
*H04J 1/16* (2006.01)
(52) U.S. Cl. ........ 370/252; 370/235; 370/255; 370/355; 370/358; 370/536
(58) Field of Classification Search .................. 370/235, 370/255, 248, 249, 355, 356, 358, 360, 566
See application file for complete search history.

(56) References Cited

U.S. PATENT DOCUMENTS

| | | | |
|---|---|---|---|
| 6,359,879 B1 * | 3/2002 | Carvey et al. ................ 370/351 |
| 6,721,316 B1 * | 4/2004 | Epps et al. .................... 370/389 |
| 6,888,797 B1 | 5/2005 | Cao et al. | |
| 6,928,482 B1 * | 8/2005 | Nun et al. ..................... 709/235 |
| 7,215,637 B1 * | 5/2007 | Ferguson et al. .......... 370/230.1 |
| 7,239,608 B2 * | 7/2007 | Sreejith et al. ............... 370/230 |
| 7,298,752 B2 * | 11/2007 | Moriwaki et al. ............ 370/401 |
| 7,466,703 B1 * | 12/2008 | Arunachalam et al. ....... 370/392 |
| 7,567,504 B2 * | 7/2009 | Darling et al. ............... 370/216 |
| 7,623,455 B2 | 11/2009 | Hilla et al. | |
| 7,636,917 B2 | 12/2009 | Darling et al. | |
| 7,688,727 B1 * | 3/2010 | Ferguson et al. .......... 370/230.1 |
| 7,721,125 B2 * | 5/2010 | Fung ............................. 713/320 |
| 7,787,466 B1 * | 8/2010 | Leelanivas et al. .......... 370/392 |
| 7,957,396 B1 * | 6/2011 | Kohn et al. .............. 370/395.32 |
| 7,979,552 B1 * | 7/2011 | Saraiya et al. ................ 709/226 |
| 7,986,629 B1 * | 7/2011 | Ferguson et al. ............. 370/235 |
| 2003/0023885 A1 * | 1/2003 | Potter et al. .................. 713/300 |
| 2003/0202511 A1 * | 10/2003 | Sreejith et al. ............... 370/389 |
| 2003/0204758 A1 * | 10/2003 | Singh ............................ 713/320 |
| 2004/0258064 A1 * | 12/2004 | Nakamura et al. ........... 370/389 |
| 2006/0032872 A1 * | 2/2006 | Yamane ........................ 222/566 |
| 2006/0101159 A1 * | 5/2006 | Yeh et al. ..................... 709/246 |
| 2008/0046895 A1 | 2/2008 | Dillenberger et al. | |
| 2008/0066073 A1 | 3/2008 | Sen | |
| 2008/0285553 A1 | 11/2008 | Abdulla et al. | |
| 2009/0109230 A1 | 4/2009 | Miller et al. | |
| 2010/0302940 A1 * | 12/2010 | Patel et al. .................... 370/230 |

* cited by examiner

*Primary Examiner* — Andrew Lai
*Assistant Examiner* — Andrew C Lee

(57) ABSTRACT

According to one example of the present invention, there is provided a method of routing data packets to a plurality of packet processors in a computer network. The method comprising obtaining workload data from the packet processors, determining a workload distribution across the packet processors, and updating a balancing table used by a switching element in the network based on the determined workload.

15 Claims, 5 Drawing Sheets

DATA PACKET ROUTING

BACKGROUND

In computer networks it is common for the processing of data packets to be distributed over multiple packet processors, which may themselves be distributed over different computer hardware or over different virtual servers.

Data packets from some data streams may be suitably processed by any available packet processor, whereas data packets from other data streams may need processing by one or more specified packet processors.

However, with distributed processing systems it is generally important that the processing load be appropriately distributed across all of the available processors to avoid processing delays and workload imbalances. Load balancing is often further complicated where processor affinity is desired.

BRIEF DESCRIPTION

Examples and embodiments of the invention will now be described, by way of non-limiting example only, with reference to the accompanying drawings, in which.

DETAILED DESCRIPTION

The processing of data packets in computer networks is performed for numerous reasons. The processing of data packets can be a processor intensive task, and the time taken to process different data packets may vary widely depending on the contents of the data packet and the nature of the processing required. Such variations are difficult to predict and processing delays may occur when a packet processor is sent too many data packets requiring intensive processing.

Figure 1:
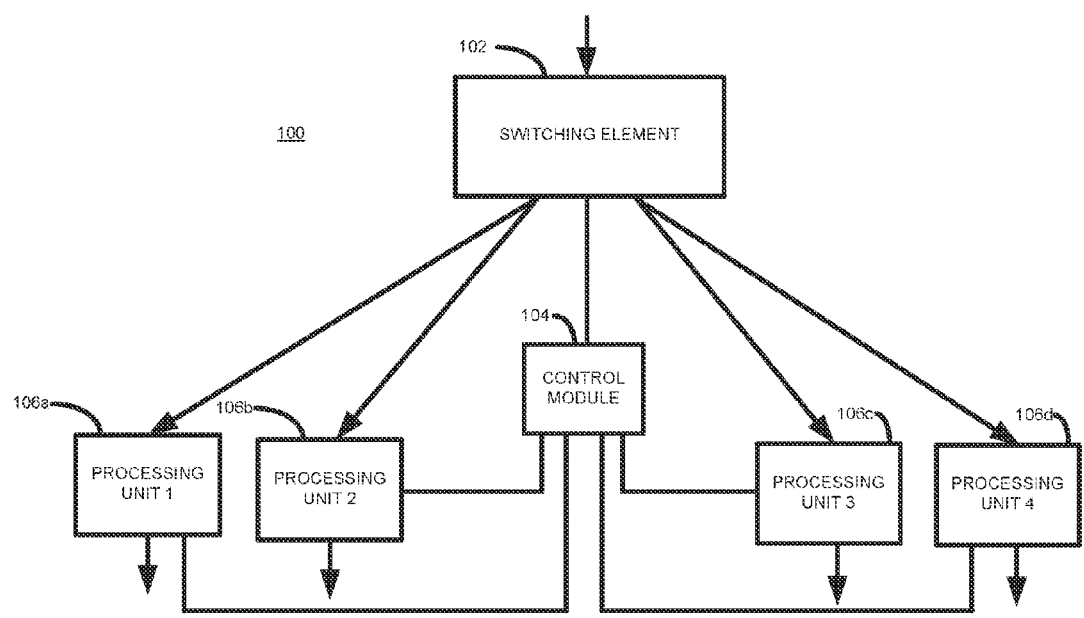
FIG. 1 is a simplified block diagram of a system according to an example of the present invention.

Referring now to FIG. 1, there is shown an illustration of a simplified block diagram of a load balancing system 100 according to one example. Further reference is made to the flow diagrams of FIG. 2 and FIG. 3.

The system 100 comprises a switching or routing element 102, such as a network switch or router, a number of packet processors 106, and a control module 104. The switching element 102 uses hash-based techniques to route or direct incoming data packets to one of the packet processors 106. Although in FIG. 1 only four packet processors are shown for clarity, it will be appreciated that the number of packet processors is not so limited. The packet processors 106 may be any kind of suitable processing units, including hardware packet processors and software packet processors. Different ones of the packet processors 106 may perform the same or different processing functions. For example, one packet processor may process video data packets, one packet processor may process telecommunication data packets, and so on.

Figure 2:
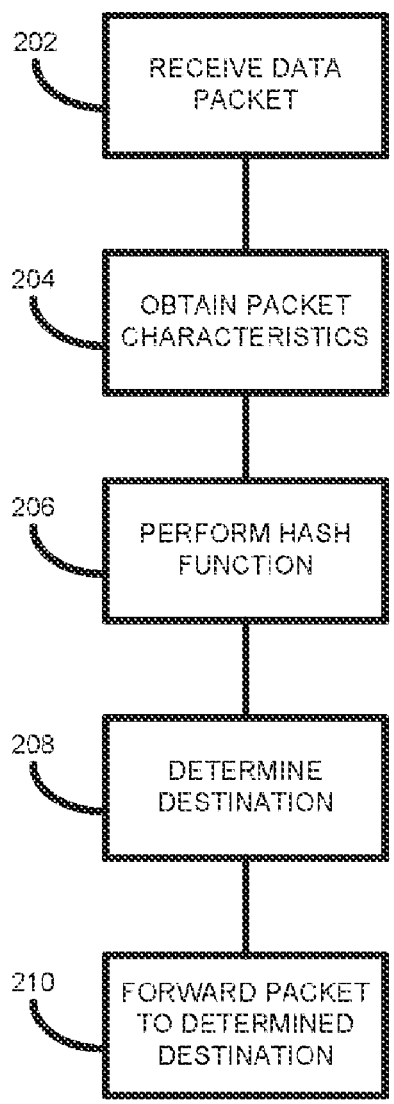
FIG. 2 is a flow diagram outlining an example method according to an example of the present invention.

A method of operating the switching element 102 according to one example is shown in FIG. 2.

The switching element 102 receives (202) data packets from a network (not shown) and obtains (204) characteristics or elements of each data packet. The obtained characteristics or elements may include, for example, packet source address, packet destination address, virtual local area network (VLAN) identifier, etc. The switching element 102 then performs (206) a predetermined hash function on the obtained characteristics.

A hash function is a mathematical transformation that transforms the obtained characteristics to a hash result in a repeatable manner. Those skilled in the art will appreciate that a wide range of suitable hash functions are generally known. Thus, where data packet source and destination address are used as the hash function inputs, data packets from the same communication stream having identical hash inputs will result in the same hash result. In some examples the hash function may be symmetrical. A symmetrical hash function gives the same hash result irrespective of the order in which the hash inputs are processed. Thus performing a symmetrical hash function on both an outbound data packet and a reply data packet will result in the same hash result, for example where source and destination address are the hash inputs.

At 208 the switching element 102 determines the destination of the received data packet using the hash result as a lookup key in a balancing table. The balancing table associates a destination identifier with one or more different hash results. At 210 the switching element 102 forwards the received data packet to the determined destination.

Depending on particular circumstances the destination identifier in the hash routing table may include, for example, a port or virtual port number indicating a processing destination, a virtual local area network (VLAN) identifier indicating a processing destination, a media access control (MAC) address indicating a processing destination, and an Internet protocol (IP) address indicating a processing destination.

One advantage of using symmetrical hash functions is that both outbound and return data packets in a data stream (i.e. having common source and destination addresses) may be easily sent or directed to the same destination packet processor.

In the following examples it is assumed that the processing function performed by each of the packet processors 106*a* to 106*d* is substantially identical, in that any received data packet may be processed by any of the packet processors 106. In other examples, however, different ones of the packet processors 106 may perform different processing functions, and data packets from different packet streams may require processing by different ones of the packet processors 106. This may be the case, for instance, if data packets from one packet stream require processing by a particular type of packet processor having a particular capability or function.

In the present example, the balancing table initially used by the switching element 102 is created to give a substantially even distribution between the different packet processors 106. This may be achieved, for example, by selecting, in a predictable, a random, or a pseudo-random manner, groups of 25% of the possible hash results and assigning them to a different one of the packet processors 106.

Example simplified balancing tables are shown below in Tables 1 and 2.

TABLE 1

Example balancing table

| HASH RESULT | DESTINATION IDENTIFIER |
|---|---|
| 0x00 to 0x3F | 1 |
| 0x40 to 0x7F | 2 |
| 0x80 to 0xBF | 3 |
| 0xC0 to 0xFF | 4 |

TABLE 2

Example balancing table

| HASH RESULT | DESTINATION IDENTIFIER |
|---|---|
| 0x00 | 1 |
| 0x01 | 2 |
| 0x02 | 1 |
| 0x03 | 4 |
| ... | ... |

In Tables 1 and 2 the destinations are shown in a generic manner, but it will be appreciated that any of the previously described destination identifiers may be used.

During operation of the system 100, it is possible that certain packet processors become more loaded than other packet processors. Such a situation can lead to processing delays at the more heavily loaded packet processors, and can lead to other packet processors being only lightly loaded. Both scenarios should be avoided for efficient operation.

To enable a more dynamic and well balanced distribution of processor tasks the balancing table used by the switching element 102 is dynamically modifiable by a control module 104. Although in FIG. 1 the control module 104 is shown as an independent module, it will be appreciated that it may, in other examples, be integrated with the switching element 102.

Figure 3:
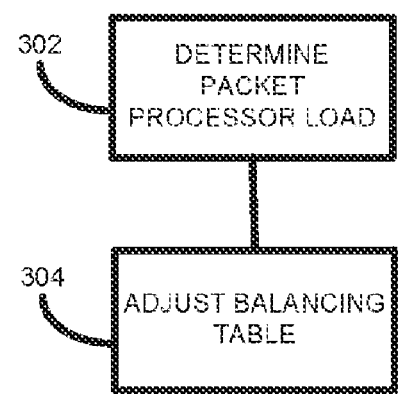
FIG. 3 is a flow diagram outlining an example method according to an example of the present invention.

A method of operating the control module 104 according one example is shown in FIG. 3.

The control module 104 periodically determines (302) the workload at each of the packet processors 106 and adjusts or modifies (304) the balancing table used by the switching element 102 in order to modify the distribution of packets to each of the packet processors 106. In one example, the modifications made to the balancing table are to try and achieve a more evenly balanced workload at each of the packet processors 106. The determination of the workload at each of the packet processors 106 may be done in various ways including, for example, determining the number of packets in a process queue, determining the processing load of the packet processor, etc. The frequency at which the control module 104 determines the workload at each of the packet processors may vary depending on the specific system characteristics.

The updating of the balancing table may be done, for example, by changing the destination identifiers associated with each hash result. For example, if the control module 104 determines that processing unit 106a is has a higher workload than other processing units, the control module 104 may change the distribution of destination identifiers associated with at least some of the hash results in the balancing table. In this way, for example, fewer hash results would be associated with the destination identifier of processing unit 106a, which in turn leads to less data packets being routed thereto. On the other hand, if the control module 104 determines that the processing unit 106a has a lower workload than other processing units, the control module 104 may modify the balancing table to cause more data packets to be sent thereto.

Advantageously, by dynamically adjusting and updating the balancing table enables fine control of the distribution of data packets to packet processors, and hence enables a good level of workload balancing. For example, if the control module 104 determines that one of the packet processors is not working, for example due to a hardware or software crash, the balancing table can be updated so that no new data packets are distributed thereto.

In another example, if the control module 104 determines that workload across one or more packet processors is below a predetermined threshold, it may update the balancing table such that no further data packets are sent to one or more of the packet processors. The control module 104 may then send a command or instruction to the packet processor to cause it to enter a sleep of reduced power mode or state, an idle state, or even to shut down completely. Such an approach may lead to significant energy savings when the overall processing demand is low. In other examples, the control module 104 may signal that the packet processor is made available for use in other processing operations, for example in a virtualized data center or the like.

Should the control module 104 later determine that additional packet processors are required, for example if it determines that the load on the other currently used packet processors is above a predetermined threshold, it may send instructions or control signals to a sleeping or shutdown packet processor to cause it to wake up and enter a normal operating state or mode. The control module 104 may then update the balancing table to distribute data packets to the new packet processor in addition to the existing packet processors.

A more detailed example will now be described with reference to FIGS. 4, 5 and 6.

Figure 4:
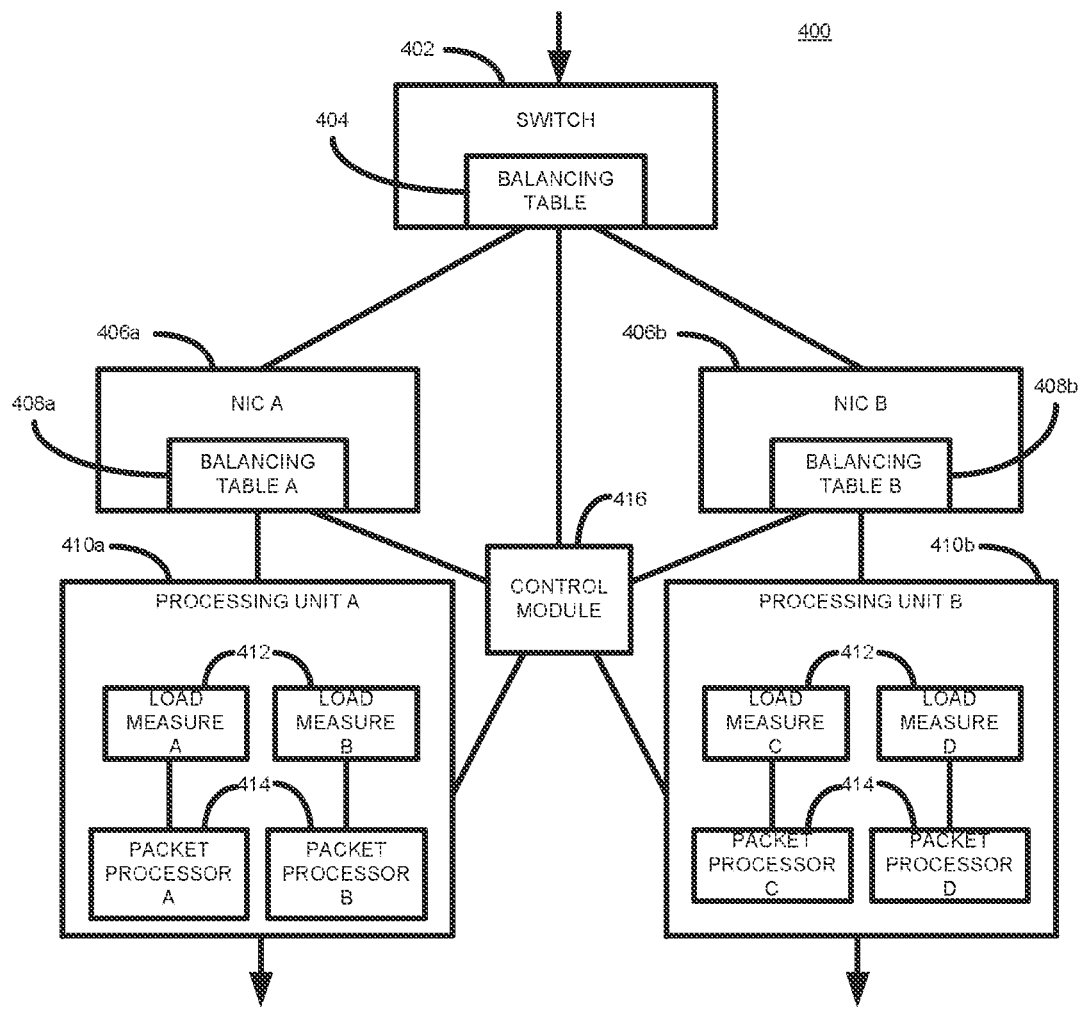
FIG. 4 is a simplified block diagram of a system according to a further example of the present invention.

In FIG. 4 a dynamic hash-based load-balancing system 400 according to one example is shown. In the example shown a number of switching elements are shown in a hierarchical arrangement. The system 400 may form part of a processing system in a computer network or system. For reasons of clarity, only one pair of network interface controllers 406 and processing units 410 are shown. It will be appreciated, however, that the number of network interface cards, switches, processing units, and packet processors are in no way limited thereto.

Figures 5, 6:
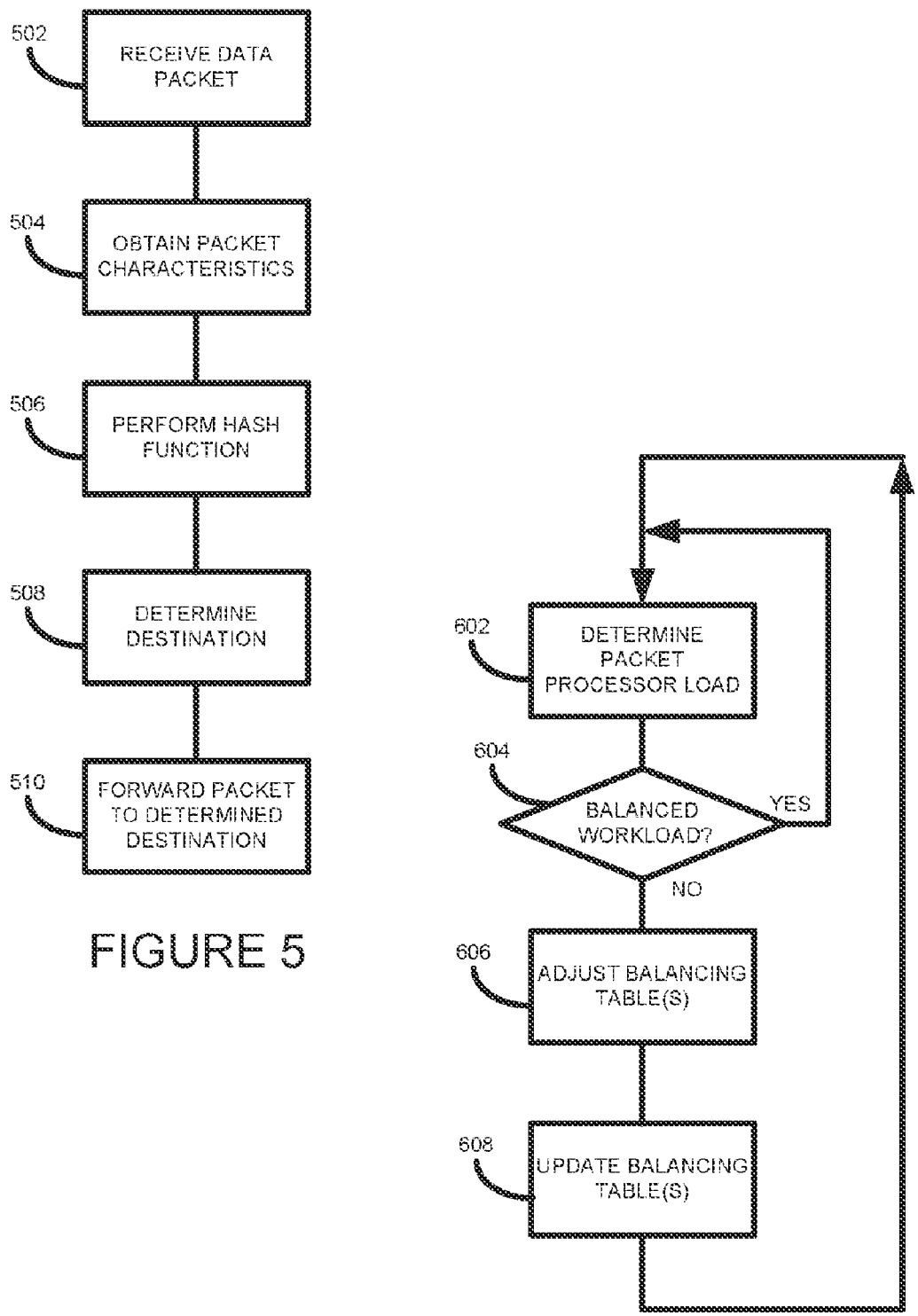
FIG. 5 is a flow diagram outlining an example method according to an example of the present invention.
FIG. 6 is a flow diagram outlining an example method according to an example of the present invention.

A method of operating a switching element 402 according to one example is shown in FIG. 5.

The switching element 402 receives (502) data packets from a computer network (not shown). The switching element 402 may be a network switch, a network router, or any other suitable switching or routing device capable of redirecting, forwarding, or routing an incoming data packet to one of a plurality of destinations on an electronic network.

The switching element 402 obtains characteristics of each received data packet. The characteristics may, for example, be extracted from the data packet header, or from any other appropriate part of the data packet. Header information may include, for example, TCP Layer 2 information, TCP Layer 3, or any other appropriate data. In the present example the switching element 402 obtains (504) the destination address ($A_D$) and source address ($A_S$) of the received data packet from the packet header. The data packets may be, for example, an Internet protocol (IP) data packet, a transport control protocol (TCP) data packet, or any other suitable kind of data packet.

The switching element 402 performs (506) a predetermined hash function f on the destination and source address to give a hash result $H_1$:

$$H_1 = f_1(A_D, A_S) \quad (1)$$

The switching element 402 then performs (508) a lookup in a balancing table 404 accessible by the switching element 402 to determine where the received data packet is to be sent. The balancing table 404 may be integral to the switching element 402, or in other examples may be accessible remotely. The balancing table 402 may be implemented in any appropriate manner. In one example, the balancing table is a random access memory (RAM) based lookup table where destination identifiers are associated with individual hash results. In another example, destination identifiers are associated with groups or ranges of hash results using a ternary content-addressable memory (TCAM) that is able to perform wild-card destination identifier assignments across a range of hash results.

At 510 the switching element 402 forwards or directs the data packet to the determined destination.

In the present example the switching element 402 routes data packets to different packet processing units 410 over different virtual local area networks (VLANs). As described above, however, in other examples destination identifiers associated with hash results may identify a port of virtual port number, a MAC address, an IP address, or the like.

Each packet processing unit 410 comprises a number of different packet processors 414.

In the present example the balancing table 404 associates groups of hash results with a VLAN, as shown below in Table 3.

TABLE 3

Example balancing table

| HASH RESULTS | DESTINATION VLAN |
|---|---|
| 0x00 to 0x3F | 1 |
| 0x40 to 0x7F | 2 |
| 0x80 to 0xBF | 3 |
| 0xC0 to 0xFF | 4 |

The switching element 402 then routes the data packet on the determined VLAN. Data packets routed on a particular VLAN are received (502) by an appropriate load-balancing network interface controller (NIC) 408. The receiving NIC 406 obtains (504) characteristics of the received data packet, performs (506) a predetermined hash function $f_2$ on the obtained characteristics to give a hash result $H_2$. Note that the hash function $f_2$ may be different from the hash function $f_1$. In some examples, the hash function used by each NIC 406 in the system 400 may be different depending on particular circumstances, including the number of available packet processors 414 in each processing unit 410, the type of processing function performed by the packet processors 414, etc.

The NIC 406 then determines (508) the destination of the received data packet by performing a lookup in a balancing table 408. Note that the balancing tables 408 may be different from the balancing table 404. In some examples, depending on the configuration of each processing unit 410, each balancing table 408 may be different for each NIC 406 or switching element.

At 510 the NIC 406 forwards or directs the data packet accordingly to the determined packet processor 414.

As can be seen, hierarchical layers of switching may used.

Figure 7:
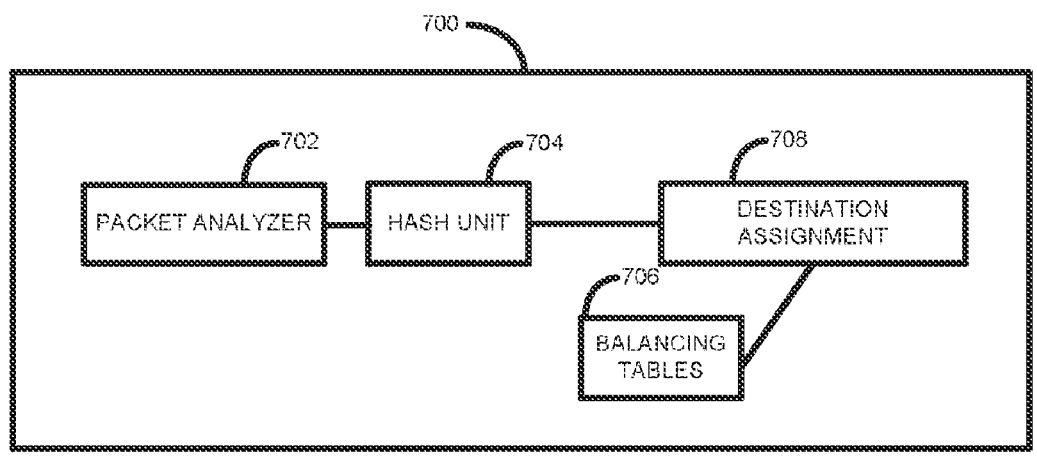
FIG. 7 is a simplified block diagram of a load-balancing module according to an example of the present invention.

Referring now to FIG. 7 there is shown an example of a load-balancing module 700 that may be incorporated into or used by switching elements such as the switching element 402 and the NICs 406. The load-balancing module 700 comprises a data packet analyzer 702 for analyzing a received data packet and for obtaining predetermined characteristics. As described above, in the present examples the predetermined characteristics may include data packet source and destination address. The module 700 further comprises a hash processing unit 704 for performing a hash function on the obtained predetermined characteristics. The module 700 further comprises a balancing table 706 which is used by a destination assignment module 708 for determining, based on the hash result of the hash processing unit 704 the destination of the analyzed data packet.

Each processing unit 410 comprises a load measuring module 412 that enables a determination of the load of each individual packet processor 414 to be made. The load measuring modules 412 may determine a load measurement for their associated packet processor 414 in any suitable manner. For example, the load measuring module 414 may keep a count of the number of received data packets waiting to be processed in a packet queue. In other examples, the load measuring module 414 may use operating system or hardware functions to determine the processor load of a packet processor.

The operation of a control module 416 according to one example will now be described with reference to FIG. 6.

The control module 416 periodically determines (602) the workload of each of the processing units 410. In some examples the control module 416 interrogates each load measuring module 412 to obtain workload data. In other examples the load measuring modules 412 send workload data to the control module 416.

The control module 416 determines (604) whether the workload across the processing units 412 is suitably balanced. If it determines that the workload is suitably balanced, the control module waits for a predetermined delay, and again determines (602) the workload of the packet processors 414.

If the control module 416 determines (604) that the workload across the processing units 412 is not suitably balanced, it adjusts (606) the balancing table (or balancing tables) used by the system 400 and updates (608). In one example, the modifications made to the balancing table(s) are made to achieve a more even workload distribution. In other examples, modifications may be made to the balancing table(s) to achieve a non-balanced workload. As previously described, the balancing tables 404 and 408 may be different from one another. In some examples, the balancing tables associated with each NIC 406 may be different. The control module 416 is able to modify each individual routing table in the system 400.

For example, if the control module 416 determines that the packet processor A has a higher workload than the packet processor B it can adjust (606) the balancing table of NIC 'A' 408 so that a greater proportion of the hash results are associated with packet processor B than with packet processor A. If the control module 416 later determines that the packet processor A has a lower workload than packet processor B it can adjust (606) the balancing table to more evenly distribute processing tasks between the packet processors in the processing unit A 410.

The control module 416 may adjust (606) and update (608) the balancing tables in any of the switching elements 402 and 406 in any appropriate manner. For example, if the control module 416 determines that packet processor A has a high workload, the control module 416 may adjust (606) and update (608) the balancing table 404 to cause the switching element 402 to send a greater proportion of data packets to NIC B 406 than to NIC A 406. It will become apparent that in other examples a whole range of different balancing table adjustment strategies may be used.

In a further example, the packet analyzer 702 of each switching element 402 and 406 determines the type of data packet received and the hash unit 704 performs (506) a predetermined hash function $f_n$ associated with the determined data packet type. The destination assignment module 708 then performs a lookup in a balancing table associated with the determined data packet type. In this way, different types of data packet may be load-balanced over a set of suitable packet processors.

As described above, it is apparent that the packet processing load-balancing systems may be deployed in various configurations depending on the particular network topology and load-balancing strategy. The nature of the destination identifiers described above may also depend on the particular network topology.

For example, in the example described above with reference to FIG. 1 only a single load-balancing element, such as a switch, an enhanced switch, a NIC, or an enhanced NIC is shown, with the packet processors being directly connected to the load-balancing element. In this example, the destination identifiers in the balancing table may directly identify each packet processor, for example, using a port number, a virtual port number, a queue identifier, or the like.

In the example described above with reference to FIG. 4, the system comprises multiple load-balancing elements arranged in a hierarchical manner. Some load-balancing elements are thus connected directly to the packet processors, whereas other load-balancing elements are connected to yet other load-balancing elements. For those load-balancing elements connected directly to packet processors, the destination identifiers in their associated balancing tables may directly identify each packet processor, for example, using a port number, a virtual port number, a queue identifier, or the like. For those load-balancing elements connected to other load-balancing elements the destination identifiers in their associated balancing tables may be a VLAN identifier, a MAC address, an IP address, or the like, identifying the end of the tunnel at a packet processor. If tunneling is used, a switching element may encapsulate a received data packet to form a larger container packet comprising the received data packet and additional data identifying the other end of the tunnel as being the intended destination.

In other examples, if two or more load-balancing are directly connected to each other, the destination identifiers in their associated balancing tables may be, for example, a port number, a virtual port number, a queue identifier, or the like. If two or more load-balancers are connected through other networking devices tunneling techniques, as described above, may need to be used. In this case, the destination identifiers in the respective balancing tables may be a VLAN identifier, a MAC address, an IP address, of the like, identifying the end of the tunnel at an appropriate packet processor.

Figure 8:
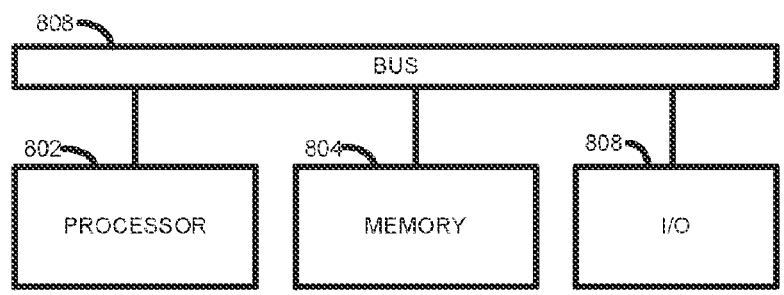
FIG. 8 is a simplified block diagram showing an implementation of a control module according an example of the present invention.

In one example, as shown in FIG. 8, the control module 416 is implemented using a computer processing system. The control module 416 comprises, for example, a micro processor, control logic, or micro controller 602 for executing machine readable instructions stored in a memory 604. The machine readable instructions may, when executed by the processor 602, perform method steps as described above. Input and output operations may be handled by an I/O module 606. The processor 602, memory 604, and I/O interface 606 are coupled via a bus 608.

In a further example, a load-balancer and control module, may be implemented in a server blade having an enhanced load-balancing network interface card (NIC).

It will be appreciated that examples of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement examples of the present invention. Accordingly, examples provide a program comprising code for implementing a system or method as described above and a machine readable storage storing such a program. Still further, examples of the present invention may be conveyed electronically via any medium such as a communication signal carried over a wired or wireless connection and examples suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A system for routing data packets to a plurality of processors in a network comprising:
   a switching element to receive data packets and to route each received data packet to one of the plurality of processors, the switching element comprising:
   a packet analyzer to obtain data packet characteristics including a destination address;
   a processing unit to perform a predetermined function on the obtained characteristics to generate a lookup key from the destination address, a number of different destination addresses generating the same lookup key; and
   a routing element to determine a destination for the data packet based on the lookup key and a balancing table, which associates an adjustable number of lookup keys with each of the plurality of processors, and to route the data packet to the determined destination; and
   a control module to determine a workload distribution across at least some of the plurality of processors and to modify the balancing table in accordance with the determined workload, wherein modifying the balancing table includes redistributing the number of lookup keys associated with each of the plurality of processors, reducing the number of lookup keys associated with one or more of the processors to zero, and increasing the number of lookup, keys associated with one or more of the processors.

2. The system of claim 1, wherein the predetermined function is a hash function.

3. The system of claim 1, wherein the predetermined function is a symmetric hash function.

4. The system of claim 1, wherein the packet analyzer obtains source and destination addresses of the data packet.

5. The system of claim 4, wherein the routing element performs a hash function on the source and destination addresses of the data packet.

6. The system of claim 1, the control module being further arranged for:
   determining when one or more processors have a workload below a predetermined threshold; and
   modifying the balancing table to prevent further data packets being distributed to the determined processor or processors.

7. The system of claim 6, wherein the control module is further arranged for sending a signal to the determined processor or processors to cause the determined processor or processors to enter a reduced power mode.

8. The system of claim 1, the control module being further arranged for:
   determining when a processor has a workload above a predetermined threshold;
   sending a signal to a processor in a reduced power mode to enter a normal operating mode; and
   updating the balancing table to include the determined processor so that at least some subsequently received data packets may be distributed thereto.

9. The system of claim 1, wherein the control module is arranged to modify the balancing table by modifying destination identifiers associated with the each lookup key.

10. The system of claim 1, further comprising a plurality of switching elements each having an individual balancing table, the control module arranged to modify the balancing tables of any of the switching elements.

11. A method of routing data packets to a plurality of packet processors in a computer network, the method comprising:
    obtaining characteristics of a data packet, the characteristics including a destination address;
    generating a lookup key based on the destination address by performing predetermined function on the data packet's characteristics, wherein a number of different destination addresses generating the same lookup key;
    routing a data packet to one of a plurality of packet processors based on the lookup key and a balancing table, which associates an adjustable number of lookup keys with each of the plurality of processors;
    obtaining workload data from the packet processors;
    determining a workload distribution across the packet processors; and
    updating the balancing table used by a switching element in the network based on the determined workload.

12. The method of claim 11, further comprising:
    determining when one of the packet processors has a higher workload than other packet processors; and
    updating the balancing table to cause less data packets to be routed by the switching element to the determined packet processor.

13. The method of claim 11, further comprising:
    determining when one of the packet processors has a lower workload than other packet processors; and
    updating the balancing table to cause more data packets to be routed by the switching element to the determined packet processor.

14. The method of claim 11, wherein the balancing table associates hash results with destination identifiers identifying packet processors.

15. A system, comprising:
    a network switching element further comprising:
    a packet analyzer to obtain a data packet's characteristics including a destination address;
    a processing unit to generate a lookup key based on the destination address by performing a predetermined function on the data packet's characteristics, wherein a number of different destination addresses generating the same lookup key;
    a routing element to route a data packet to one of a plurality of packet processors based on the lookup key and a balancing table, which associates an adjustable number of lookup keys with each of the plurality of processors;
    a control module to obtain workload data from a packet processor; determine a workload distribution across a plurality of packet processors; and
    update the balancing table used by the network switching element based on the determined workload.

* * * * *

UNITED STATES PATENT AND TRADEMARK OFFICE
CERTIFICATE OF CORRECTION

PATENT NO. : 8,391,174 B2
APPLICATION NO. : 12/834951
DATED : March 5, 2013
INVENTOR(S) : Michael Schlansker et al.

Page 1 of 1

It is certified that error appears in the above-identified patent and that said Letters Patent is hereby corrected as shown below:

In the Claims

In column 8, line 64, in Claim 1, delete "lookup," and insert -- lookup --, therefor.

In column 9, line 41, in Claim 11, delete "performing" and insert -- performing a --, therefor.

Signed and Sealed this
Thirteenth Day of August, 2013

Teresa Stanek Rea
*Acting Director of the United States Patent and Trademark Office*